(12) United States Patent
Challener et al.

(10) Patent No.: US 7,158,977 B2
(45) Date of Patent: Jan. 2, 2007

(54) METHOD AND SYSTEM FOR IDENTIFYING MASTER PROFILE INFORMATION USING CLIENT PROPERTIES SELECTED FROM GROUP CONSISTING OF CLIENT LOCATION, USER FUNCTIONALITY DESCRIPTION, AUTOMATICALLY RETRIEVING MASTER PROFILE USING MASTER PROFILE LOCATION IN AUTONOMIC COMPUTING ENVIRONMENT WITHOUT INTERVENTION FROM THE USER

(75) Inventors: David Carroll Challener, Raleigh, NC (US); Jeffrey Vernon Ford, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 525 days.

(21) Appl. No.: 10/718,940

(22) Filed: Nov. 21, 2003

(65) Prior Publication Data

US 2005/0114339 A1 May 26, 2005

(51) Int. Cl.
*G06F 17/30* (2006.01)
*G06F 17/00* (2006.01)
*G06F 15/16* (2006.01)

(52) U.S. Cl. .................... 707/10; 707/104.1; 707/200; 709/217

(58) Field of Classification Search ............... 707/1–4, 707/10, 100, 104.1, 200; 726/17; 709/217–219, 709/226–227; 700/19; 399/8–12; 702/183–188; 715/736–745

See application file for complete search history.

(56) References Cited

U.S. PATENT DOCUMENTS 5,784,563 A * 7/1998 Marshall et al. ............ 709/221
6,044,465 A * 3/2000 Dutcher et al. ............... 726/13

(Continued)

FOREIGN PATENT DOCUMENTS

WO     WO 98/49640     * 11/1998      ............... 17/60

(Continued)

OTHER PUBLICATIONS

Alessandra Agostini et al. "integrated profile management for mobile computing", no date,5 pages.*

(Continued)

*Primary Examiner*—Srirama Channavajjala
(74) *Attorney, Agent, or Firm*—VanLeeuwen & VanLeeuwen; Carlos Munoz-Bustamante

(57) ABSTRACT

A system and method to allow valid profiles in autonomic computing discover is presented. A client accesses a network and sends a profile information request to a central computing device, such as a server. The server identifies client properties, such as the client's location and a user functionality description which corresponds to the client's user. The server uses the identified client properties to select an appropriate master profile from a master profile look-up table. The server sends master profile information, such as the master profile's pathname and revision time, to the client. In turn, the client determines whether it already has a valid profile or whether it should download an up-to-date version. If the client requires an up-to-date profile version, the client downloads the master profile from the server and uses the downloaded profile for various computing tasks.

8 Claims, 6 Drawing Sheets

U.S. PATENT DOCUMENTS

| | | | | |
|---|---|---|---|---|
| 6,167,408 | A | 12/2000 | Cannon et al. | 707/203 |
| 6,393,473 | B1 | 5/2002 | Chu | 709/223 |
| 6,466,932 | B1 | 10/2002 | Dennis et al. | 707/3 |
| 6,470,401 | B1* | 10/2002 | Peterson | 710/33 |
| 6,598,032 | B1* | 7/2003 | Challener et al. | 705/72 |
| 6,757,720 | B1* | 6/2004 | Weschler, Jr. | 709/220 |
| 6,782,349 | B1* | 8/2004 | Challener et al. | 702/186 |
| 6,823,463 | B1* | 11/2004 | Challener et al. | 726/5 |
| 6,859,668 | B1* | 2/2005 | Ginzburg et al. | 700/19 |
| 7,010,596 | B1* | 3/2006 | Bantz et al. | 709/224 |
| 2002/0158899 | A1* | 10/2002 | Raymond | 345/736 |
| 2002/0165961 | A1 | 11/2002 | Everdell et al. | 709/225 |
| 2003/0023057 | A1* | 1/2003 | Gure et al. | 536/23.2 |
| 2003/0023601 | A1* | 1/2003 | Fortier et al. | 707/10 |
| 2003/0028451 | A1* | 2/2003 | Ananian | 705/27 |
| 2003/0128991 | A1* | 7/2003 | Carling et al. | 399/8 |
| 2003/0135611 | A1* | 7/2003 | Kemp et al. | 709/224 |
| 2004/0044658 | A1* | 3/2004 | Crabtree et al. | 707/3 |
| 2004/0260565 | A1* | 12/2004 | Zimniewicz et al. | 705/1 |

FOREIGN PATENT DOCUMENTS

| | | | | |
|---|---|---|---|---|
| WO | WO 0051031 | * | 8/2000 | 17/30 |
| WO | WO 2004/077784 | * | 9/2004 | 29/6 |

OTHER PUBLICATIONS

Max Ziegler et al. "secure profile management in smart home networks", proceedings of the 16th International workshop on database and expert systems applications, 2005 IEEE 5 pages.*

Noha Adly et al. "A profile-ased hierarchical location management scheme for future PCS", IEEE 2000, pp. 204-208.*

Pablo Vidales et al. "autonomic system for mobility support in 4G networks", IEEE journal on selected areas in communication, vol. 23, No. 12, Dec. 2005, pp. 2288-2304.*

* cited by examiner

200 ⇥

| CLIENT LOCATION | USER FUNCT. DESCRIPTION | PROFILE | FILE LOCATION | LAST UPDATE | |
|---|---|---|---|---|---|
| Building 1 | Engineering | E1 | server\profiles\engr | 10/1/03 4:17p | — 230 |
| | Accounting | A1 | server\profiles\acct | 8/15/02 12:15a | — 235 |
| | Management | M1 | server\profiles\mgmt | 9/25/03 12:43p | — 240 |
| Building 2 | Engineering | E2 | peer\eng\profiles | 10/2/03 3:30p | — 245 |
| | Accounting | A2 | peer\act\profiles | 4/12/03 2:34p | — 250 |
| | Management | M2 | peer\mgmt\profiles | 6/14/03 2:15p | — 255 |

| USER FUNCT. DESCRIPTION | CLIENT LOCATION | PROFILE | LAST UPDATED | |
|---|---|---|---|---|
| Engineering | Building 1 | E1 | 10/1/03 4:17p | — 285 |
| | Building 2 | E2 | 7/12/03 7:36a | — 290 |
| | Remote | ER | 9/18/03 11:15a | — 295 |

*Figure 2B*

METHOD AND SYSTEM FOR IDENTIFYING MASTER PROFILE INFORMATION USING CLIENT PROPERTIES SELECTED FROM GROUP CONSISTING OF CLIENT LOCATION, USER FUNCTIONALITY DESCRIPTION, AUTOMATICALLY RETRIEVING MASTER PROFILE USING MASTER PROFILE LOCATION IN AUTONOMIC COMPUTING ENVIRONMENT WITHOUT INTERVENTION FROM THE USER

BACKGROUND OF THE INVENTION

1. Technical Field

The present invention relates in general to a system and method to allow valid profiles in autonomic computing discovery. More particularly, the present invention relates to a system and method for a client to retrieve valid profiles from a central computing device based upon client properties.

2. Description of the Related Art

Within the past two decades, the development of raw computing power coupled with the proliferation of computer devices has grown at exponential rates. This phenomenal growth, along with the advent of the Internet, has led to a new age of accessibility to other people, other systems, and to information.

The simultaneous explosion of information and integration of technology into everyday life has brought on new demands for how people manage and maintain computer systems. The demand for information technology professionals is already outpacing supply when it comes to finding support for someone to manage complex, and even simple computer systems. As access to information becomes omnipresent through personal computers, hand-held devices, and wireless devices, the stability of current infrastructure, systems, and data is at an increasingly greater risk to suffer outages. This increasing complexity, in conjunction with a shortage of skilled information technology professionals, points towards an inevitable need to automate many of the functions associated with computing today.

Autonomic computing is one proposal to solve this technological challenge. Autonomic computing is a concept to build a computer system that regulates itself much in the same way that a person's autonomic nervous system regulates and protects the person's body. One enabling technology of autonomic computing is for a client-based application to acquire profiles without user intervention. In a non-autonomic environment, an application typically requests that a user provide profile settings (e.g. printer settings). In an autonomic environment, however, a desire exists to eliminate a requirement for a user to input profile information. Especially in situations where a user accesses a network from multiple locations (i.e. multiple buildings, remotely, etc.), the user may use separate profiles for each location. For example, a user may wish to print a document at a printer that is located in the same building that the user's computing device is accessing a computer network.

A suggested approach for a client to acquire profiles without user intervention is for a client to share profiles among peer clients in order to obtain profile information. A challenge found with this approach, however, is that there is no guarantee that a peer client device has up-to-date profile information. In addition, users may wish to control policy and profile propagation in a more secure manner.

What is needed, therefore, is a system and method for effectively managing and automating client profile updates in an autonomic computing environment.

SUMMARY

It has been discovered that the aforementioned challenges are resolved by using a central computing device, such as a server, to manage and distribute master profiles. A client sends a request to the central computing device which includes a request for master profile information. The central computing device provides a master profile to the client whereby the master profile corresponds to the client's user functionality description and the client's location.

A client uses particular profiles based upon its location. For example, a client may wish use a profile that corresponds to its location (i.e. building) in order to use a printer which is located at the same location. The client uses a profile look-up table to track the client's existing profiles which are organized based upon a client's location, such as "building 1" or "building 2." In addition, the profile look-up table includes a version time for each existing profile whereby the version time corresponds to a profile's last revision.

When a client accesses a network, the client sends a profile information request to a server that manages master profile updates. The profile information request includes client properties, such as the client's location and a user functionality description that corresponds to the client's user, such as "ENGINEERING" or "MARKETING." The server uses a profile service program to process the client's profile information request. The profile service program uses the client's properties to identify a corresponding master profile. The master profile information is stored in a master profile look-up table which is organized by a client's location and a client's user functionality description. For example, the client may be in "building 1" and the client's user description identifier is "marketing". In this example, the profile service program identifies a master profile that corresponds to building 1 which is designated for the Marketing department.

The profile service program includes master profile information in a master profile information message (i.e. pathname and revision time), and sends the message to the client. The client analyzes the master profile information message, and determines whether the client already has a valid profile version by comparing the master profile revision time with the client's existing profile revision time. If the client determines that it should retrieve a new master profile, the client uses the master profile's pathname to retrieve the corresponding master profile. In addition, the client updates its profile table to reflect its most recent download, and uses the newly downloaded profile for various computing tasks.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 2A is a server's master profile lookup table that a server accesses to inform a client as to the location and revision time of a particular master profile;

FIG. 2B is a client's preferences table that tracks a client's existing profiles corresponding to various locations;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
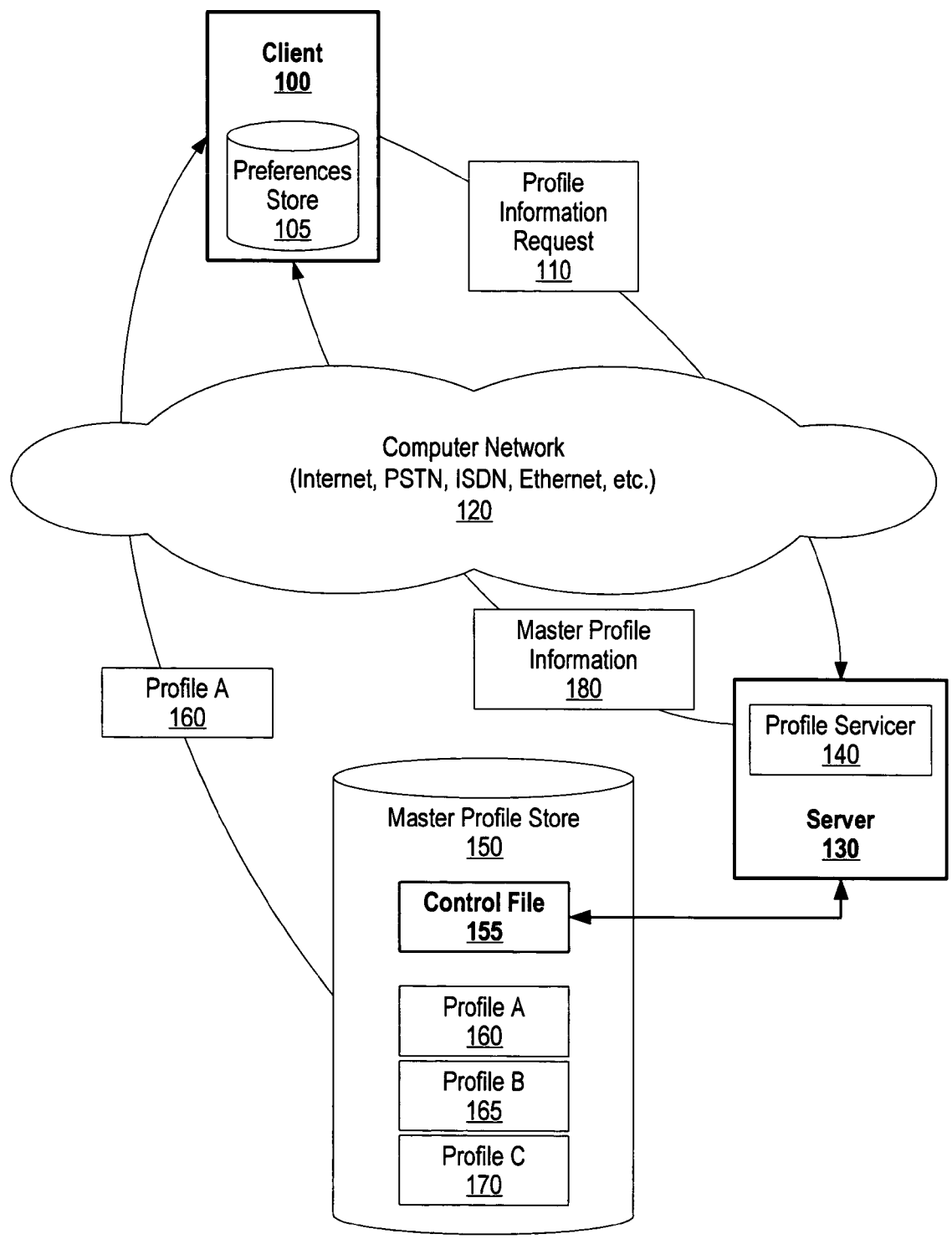
FIG. 1 is a diagram showing a client requesting profile information from a server and retrieving new profile information from a server's storage area.

FIG. 1 is a diagram showing a client requesting profile information from a server and retrieving new profile information from a server's storage area. Client 100 is a computing device, such as a laptop computer, that uses particular profiles based upon its location. Client 100 uses a profile for various tasks, such as printing to a printer. For example, client 100 may travel between two buildings and client 100's user wishes to print documents at a printer that is located within the building that he is located. In this example, client 100 has a profile for the first building that includes printers located within the first building and client 100 also has a second profile that includes printers located within the second building.

Client 100 stores its profiles in preferences store 105. Preference store 105 includes a lookup table that includes various profiles that client 100 uses at particular locations (see FIG. 2B and corresponding text for further details regarding profile look-up table properties). Preference store 105 may be stored on a nonvolatile storage area, such as a computer hard drive.

Client 100 uses server 130 to ensure that client 100 uses up-to-date profiles. Server 130 manages master profiles in order to ensure that clients use the most recent version of a particular profile. Client 100 sends profile information request 110 to server 130 over computer network 120, such as the Internet. Profile information request 110 includes client properties such as the client's location and a user functionality description that corresponds to the client's user, such as "ENGINEERING" or "MARKETING."

Server 130 includes profile servicer 140 which is a program that processes client profile requests. Profile servicer 140 uses the client's properties to identify a corresponding master profile. The master profiles are included in master profile store 150 (e.g. profile A 160, (profile B 165, and profile C 170). The identities and locations of each master profile are stored in control file 155. For example, client 100 may be in "building 1" and client 100's user description identifier is "marketing". In this example, profile servicer 140 identifies a profile that includes printer properties for printers that are designated for the Marketing department which is located in building 1. (see FIG. 2A and corresponding text for further details regarding sever lookup table properties). Master profile store 150 may be stored on a nonvolatile storage area, such as a computer hard drive.

Profile servicer 140 identifies a master profile corresponding to profile information request 110, and includes information corresponding to the master profile, such as its location and revision date, in master profile information 180 and sends master profile information 180 to client 100 through computer network 120. Client 100 analyzes master profile information 180, and determines that client 100 does not have the most recent profile version. Therefore, client 100 uses profile location information included in master profile information 180 to retrieve profile A 160 from master profile store 150. In turn, client 100 updates its profile table located in preferences store 105 to reflect its most recent download.

FIG. 2A is a server's master profile lookup table that a server accesses to inform a client as to the location and revision time of a particular master profile. Table 200 includes a list of profiles that are managed based upon a client's location and a client's user functional description. Table 200 includes columns 205 through 225. Column 205 includes a list of locations for a client. The example shown in FIG. 2A shows two client locations which are "building 1" and "building 2." As those skilled in the art can appreciate, more locations may be included in table 200 than what are shown, such as "Remote" for situations when a client accesses a computer network from a remote location.

Column 210 includes a list of user functional descriptions that correspond to a client's user. In one embodiment, the user functional descriptions may include multiple layers, such as, "Professional-Management-Engineering", whereby profiles correspond to varying layers of the user functional description. In this embodiment, a profile may be assigned at the "Professional" level. In another embodiment, a profile may be assigned at the "Engineering" level.

Column 215 includes a list of profile names that are associated with client locations and user functional descriptions. Column 220 includes a list of pathnames where master profiles included in column 215 are located. A server includes the file location in a master profile information message that it sends to a client. Column 225 includes a list of master profile revision times which corresponding profiles were updated. A server includes this information in the master profile information message as well in order for the client to determine whether the client has the most recent version of a particular profile.

Table 200 includes rows 230 through 255 that include information for particular master profiles. Rows 230 through 240 include profiles corresponding to building 1. Row 230 corresponds to a client with an "engineering" user functional description that is located in building 1. Row 235 corresponds to a client with an "accounting" user functional description that is located in building 1. Row 240 corresponds to a client with a "management" user functional description that is located in building 1.

Rows 245 through 255 include profiles corresponding to building 2. Row 245 corresponds to a client with an "engineering" user functional description that is located in building 2. Row 250 corresponds to a client with an "accounting" user functional description that is located in building 2. Row 255 corresponds to a client with a "management" user functional description that is located in building 2.

FIG. 2B is a client's preferences table that tracks a client's existing profiles corresponding to various locations. Table 260 includes columns 265 through 280. Column 265 includes a user functionality description that corresponds to a client's user. The example shown in FIG. 2B shows that an "engineer" uses the particular client to access a computer network. In one embodiment, multiple users may use a particular client and column 265 may include a user functional description for each user, such as "management", "accounting", and "engineering." Column 270 includes a list of locations which the client accesses a computer network which corresponds to a particular profile. Column 275 includes a list of profile names that correspond to the client's user functional description and the client's locations. Column 280 includes a list of revision times that correspond to the profiles that are listed in column 275. A client uses a revision time in order to determine if the client has a most recent version of a particular profile. For example, if a client receives master profile information from a server stating that a particular master profile was last updated on Jul. 1, 2003, and the client's existing profile has a revision date of Jan. 1, 2003, the client determines that it should downloaded the latest version of the master profile from the server.

Table 260 includes rows 285 through 295 that correspond to particular client locations. Row 285 shows that the client uses profile "E1" when the client is located in building 1. Row 290 shows that the client uses profile "E2" when the client is located in building 2. And, row 295 shows that the client uses profile "ER" when the client is remotely accessing a computer network.

Figure 3:
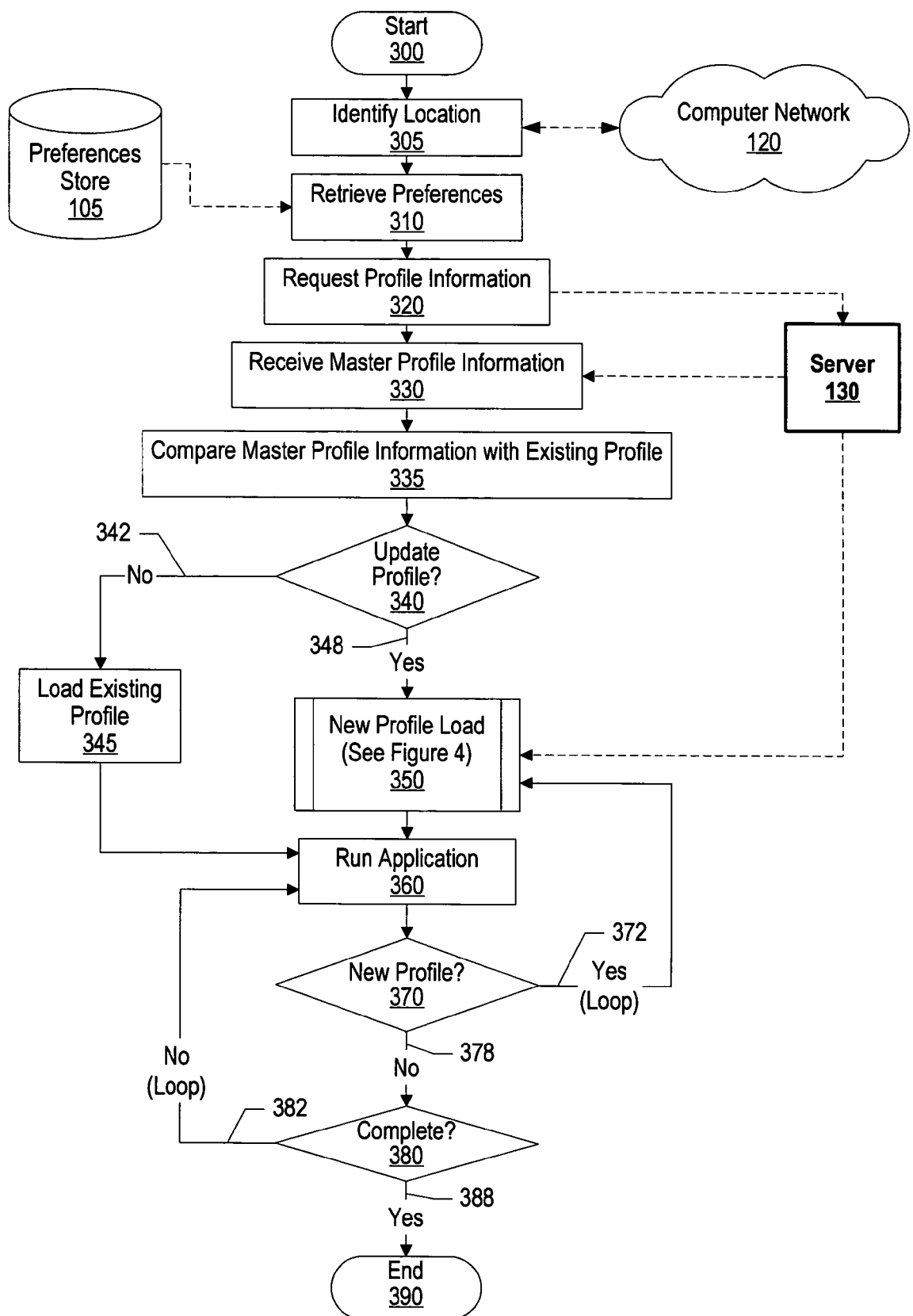
FIG. 3 is a flowchart showing steps taken in a client identifying whether the client requires an updated profile for a particular location.

FIG. 3 is a flowchart showing steps taken in a client identifying whether the client requires an updated profile for a particular location. Client processing commences at 300, whereupon the client identifies its location at step 305 by accessing computer network 120 in order to assist the client in determining which profile the client should use. For example, a client may be connected wirelessly to an access point whereby the client identifies its location using the access point's station identifier. In another example, the client may identify its location through a wired network's subnet mask identifier. Computer network 120 is the same as that shown in FIG. 1.

Processing retrieves a user functionality description from preferences store 105 that correspond to the client's user at step 310. Preferences store 105 is the same as that shown in FIG. 1 and may be stored on a nonvolatile storage area, such as a computer hard drive. Processing sends a profile request to server 130 at step 320. The profile request includes client information which is the client's location and the client's user functionality description, and may include particular application information which uses a client profile for tasks such as printing. Server 130 uses the user functionality description and the client's location to identify a proper master profile for the client (see FIG. 5 and corresponding text for further details regarding master profile selection).

Processing receives profile information from server 130 which includes the name of a master profile, the location of the profile, and a master profile revision time (step 330). Processing compares the master profile revision time with the client's existing profile revision time to see if the profile has been updated (step 335). A determination is made as to whether to update the existing profile with the new master profile in response to the comparison (decision 340). If the existing profile has the same revision time as the master profile, processing does not need to update the existing profile, and decision 340 branches to "No" branch 342 whereupon processing loads and uses the existing profile at step 345. On the other hand, if the master profile is a newer version than the existing profile, decision 340 branches to "Yes" branch 348 whereupon processing retrieves and loads the master profile (pre-defined process block 350, see FIG. 4 and corresponding text for further details).

Processing runs the application at step 360. On occasion, processing determines if a new profile should be loaded (decision 370). For example, a client may continuously run an application whereby the client, on a monthly basis, updates the client profile which includes new printing locations and preferences. If processing should load a new profile, decision 370 branches to "Yes" branch 372 which loops back to load a new profile. This looping continues until processing is not required to load a new profile, at which point decision 370 branches to "No" branch 378 whereupon a determination is made as to whether to continue processing. If processing should continue, decision 380 branches to "No" branch 382 which loops back to continue to run the application. This looping continues until processing should stop, at which point decision 380 branches to "Yes" branch 388 whereupon processing ends at 390.

Figure 4:
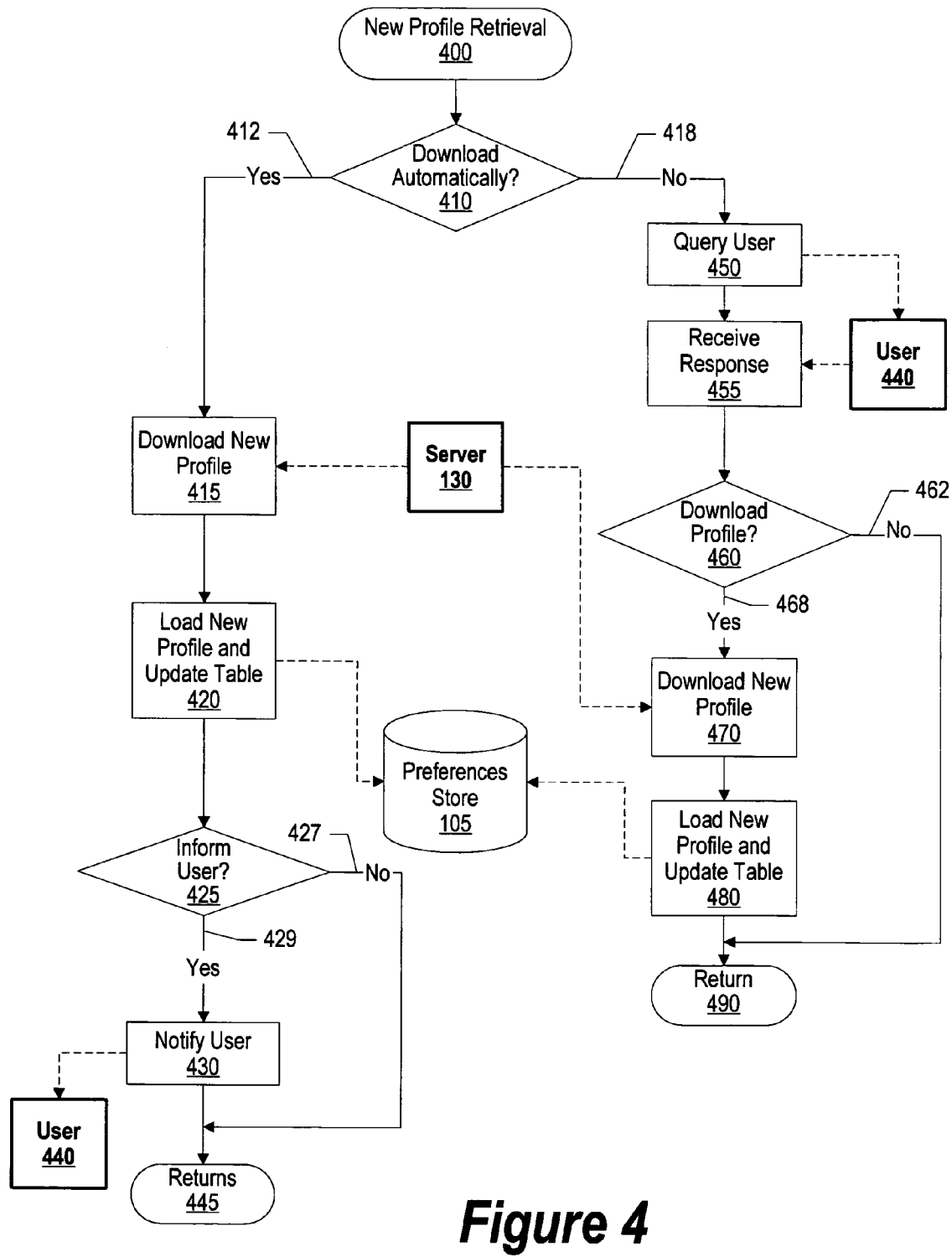
FIG. 4 is a flowchart showing steps taken in a client downloading a new profile.

FIG. 4 is a flowchart showing steps taken in a client downloading a new profile. Processing commences at 400, whereupon a determination is made as to whether to automatically download a new master profile (decision 410). For example, a user may not be concerned with the time at which profiles are downloaded and thus, enable processing to automatically download master profiles when new master profiles are available.

If processing should automatically download a new master profile, decision 410 branches to "Yes" branch 412 whereupon processing downloads the new master profile from server 130 at step 415. Processing uses location information it received from server 130 in order to locate a correct master profile (see FIG. 3 and corresponding text for further details regarding master profile information). Server 130 is a computing device and is the same as that shown in FIG. 1.

Processing loads the new master profile in preferences store 105 for the client to use for various tasks, such as printing a document, and updates its profile look-up table to reflect the new profile download (step 420). Preferences store 105 is the same as that shown in FIG. 1 and may be stored on a nonvolatile storage area, such as a computer hard drive. A determination is made as to whether processing should inform user 440 (decision 425). For example, user 440 may configure a client to automatically download master profiles when they become available, and to notify him when a master profile has been downloaded. If processing should notify user 440 of the downloaded master profile, decision 425 branches to "Yes" branch 429 whereupon processing notifies user 440 at step 430. On the other hand, if processing should not notify user 440, decision 425 branches to "No" branch 427 bypassing user notification steps. Processing returns at 445.

If processing should not automatically download a new master profile, decision 410 branches to "No" branch 418 whereupon processing queries user 440 as to whether the client should download a new master profile (step 450). Processing receives a response from user 440 at step 455, and a determination is made as to whether user 440 wishes the client to download a new master profile (decision 460). For example, user 440 may wish to access a newly installed printer whereby the new master profile includes configuration information corresponding to the newly installed printer.

If processing should not download a new master profile, decision 460 branches to "No" branch 462 bypassing profile downloading steps. On the other hand, if processing should download a new master profile, decision 460 branches to "Yes" branch 468 whereupon processing downloads a new master profile from server 130 at step 470 using location information it previously received from server 130 (see FIG. 3 and corresponding text for further details). Processing loads the new master profile in preferences store 105 and updates its profile look-up table to reflect the new profile download (step 480). Using the example described above, the client may now use the new master profile to access a newly installed printer. Processing returns at 490.

Figure 5:
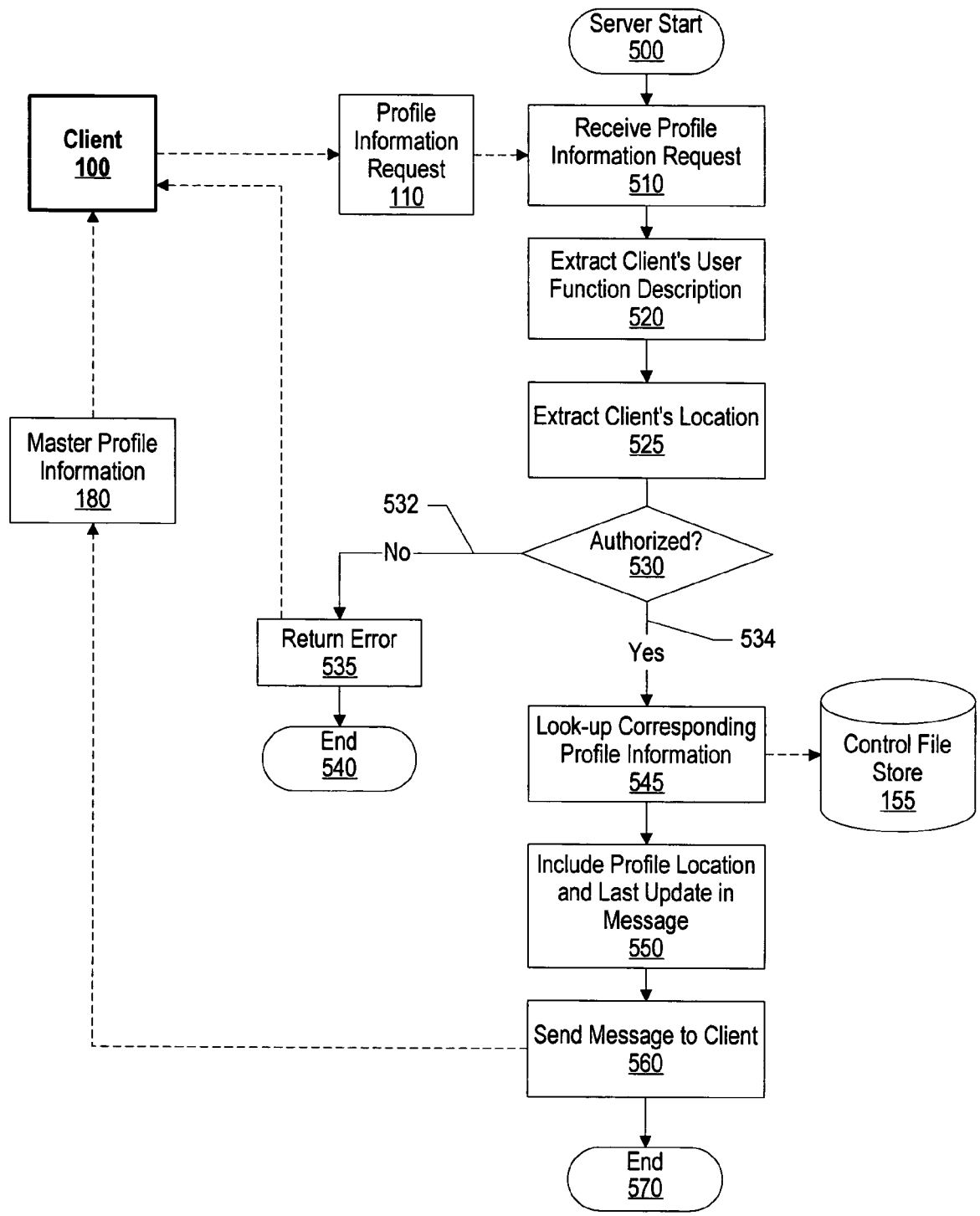
FIG. 5 is a flowchart showing steps taken in a server receiving a client request and the server sending master profile information to the client.

FIG. 5 is a flowchart showing steps taken in a server receiving a client request and the server sending master profile information to the client. Server processing commences at 500, whereupon the server receives profile information request 110 from client 100 (step 510). Profile information request 110 includes client 100's location and a user functional description that corresponds to the client's user. For example, profile information request 110 may include "building 2" as the client's location and "ENGINEERING" as the client's user functionality description. Client 100 and profile information request 110 are the same as that shown in FIG. 1.

Server processing extracts client 100's corresponding user functionality description from profile information request 110 at step 520, and extracts client 100's location from profile information request 110 at step 525. A determination is made as to whether client 100 is authorized to receive profile information (step 530). For example, profile information request 110 may include a digital certificate corresponding to client 100 which authenticates client 100. In another example, a public key/private key encryption technique may be used to authenticate client 100 and protect information transmissions between client 100 and a server. In this example, a server may authenticate client 100 if profile information request 110 is properly decrypted. In one embodiment, a server may match client 100's identifier with a look-up table that includes clients that are authorized to receive a particular profile. For example, a server may allow a limited number of individuals to access a particular printer.

If client 100 is not authorized to receive its requested profile, decision 530 branches to "No" branch 532 whereupon processing returns an error to client 100 at step 535, and processing ends at 540.

On the other hand, if client 100 is authorized to receive its requested profile, decision 530 branches to "Yes" branch 534. Processing looks-up the location of the requested profile information using a master profile lookup table which is located in control file store 155 (step 545). The master profile lookup table includes the location of particular master profiles based upon a client's location and its user functionality description (see FIG. 2A and corresponding text for further details regarding master profile look-up table properties). Control file store 155 is the same as that shown in FIG. 1 and may be stored on a nonvolatile storage area, such as a computer hard drive.

Server processing includes a profile location and the profile's revision time in a message at step 550. The server then sends the message (e.g. master profile information 180) to client 100 which client uses to determine if it should download a new master profile (step 560). Server processing ends at 570.

Figure 6:
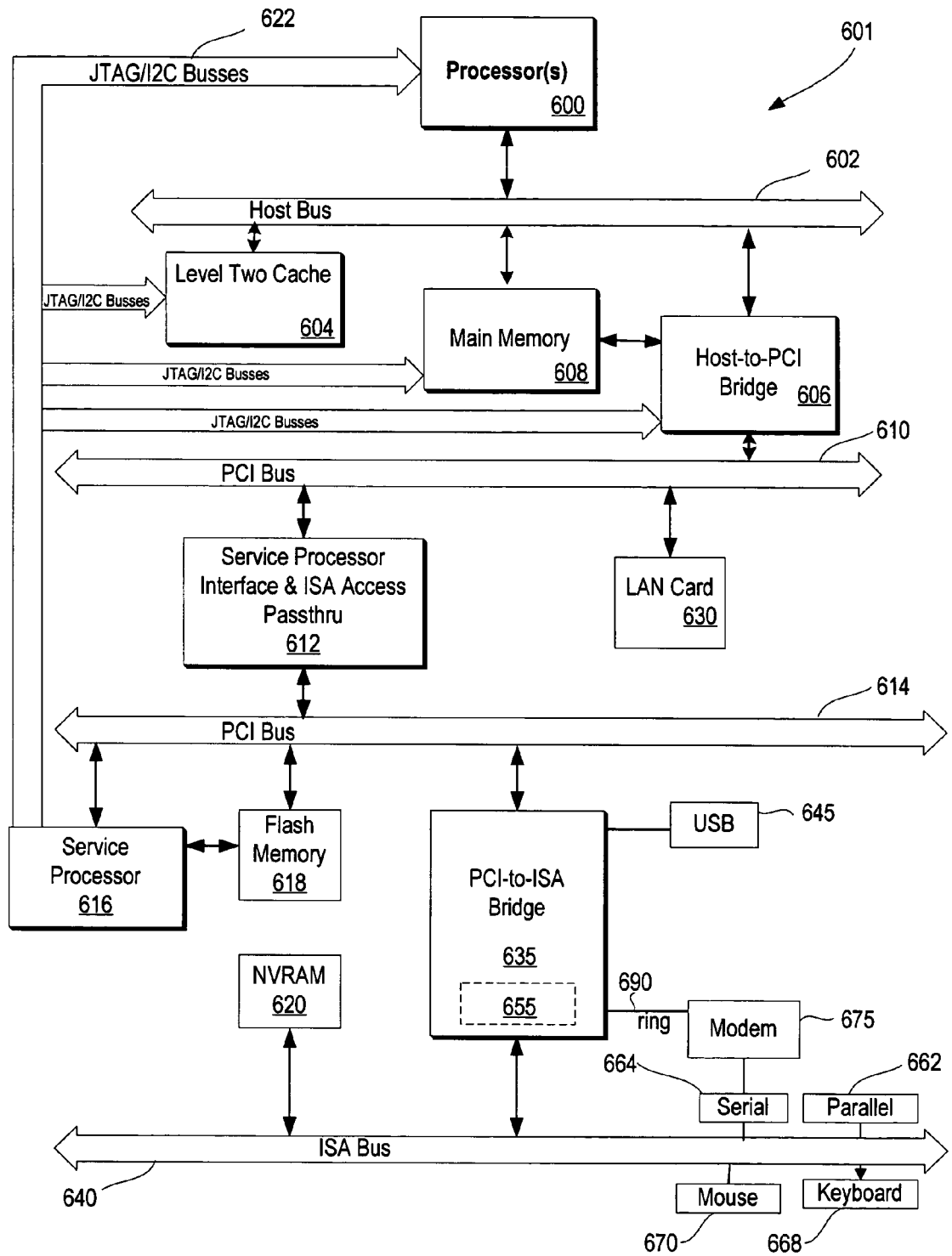
FIG. 6 is a block diagram of an information handling system capable of implementing the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method of managing a client profile, said method comprising:
   automatically sending a client request to a computing device in an autonomic computing environment without intervention from a user, the client request including a request for master profile information, wherein the computing device is adapted to identify the master profile information using client properties included in the client request, wherein the client properties are selected from the group consisting of a client location and a user functionality description;
   receiving the master profile information from the computing device in the autonomic computing environment without informing the user, wherein the master profile information corresponds to a master profile and includes a master profile location;
   in response to receiving the master profile information from the computing device, comparing a revision time of an existing profile with a revision time of the master profile;
   determining whether to retrieve the master profile based upon the comparing;
   in response to the determining, automatically retrieving the master profile using the master profile location in the autonomic computing environment without intervention from the user; and
   in response to retrieving the master profile, using the master profile for performing one or more computing tasks.

2. The method of claim 1 further comprising:
   detecting whether to notify the user of the master file retrieval; and
   notifying the user in response to the detecting.

3. The method of claim 1 wherein the computing device is adapted to use authorization information included in the client request in order to determine whether to send the master profile information.

4. An information handling system that manages a client profile comprising:
   one or more processors;
   a memory accessible by the processors;
   one or more nonvolatile storage devices accessible by the processors; and
   a client profile management tool for managing client profiles, the client profile management tool comprising software code effective to:
      automatically send a client request to a computing device in an autonomic computing environment without intervention from a user, the client request including a request for master profile information, wherein the computing device is adapted to identify the master profile information using client properties included in the client request, wherein the client properties are selected from the group consisting of a client location and a user functionality description;
      receive the master profile information from the computing device in the autonomic computing environment without informing the user, wherein the master profile information corresponds to a master profile and includes a master profile location;
      in response to receiving the master profile information from the computing device, compare a revision time of an existing profile with a revision time of the master profile;
      determine whether to retrieve the master profile based upon the comparing;
      in response to determining to retrieve the master profile, automatically retrieve the master profile from one of the nonvolatile storage devices using the master profile location in the autonomic computing environment without intervention from the user; and
      in response to retrieving the master profile, use the master profile for performing one or more computing tasks.

5. The information handling system of claim 4 wherein the software code is further effective to:
   detect whether to notify the user of the master profile retrieval; and
   notify the user in response to the detecting.

6. A computer program product stored on a computer operable media, the computer operable media containing instructions for execution by a computer, which, when executed by the computer, cause the computer to implement a method for managing a client profile, the method comprising:
   automatically sending a client request to a computing device in an autonomic computing environment without intervention from a user, the client request including a request for master profile information, wherein the computing device is adapted to identify the master profile information using client properties included in the client request, wherein the client properties are selected from the group consisting of a client location and a user functionality description;
   receiving the master profile information from the computing device in the autonomic computing environment without informing the user, wherein the master profile information corresponds to a master profile and includes a master profile location;
   in response to receiving the master profile information from the computing device, comparing a revision time of an existing profile with a revision time of the master profile;

determining whether to retrieve the master profile based upon the comparing;

in response to the determining, automatically retrieving the master profile using the master profile location in the autonomic computing environment without intervention from the user; and in response to retrieving the master profile, using the master profile for performing one or more computing tasks.

7. The computer program product of claim 6 wherein the method further comprises:

detecting whether to notify the user of the master file retrieval; and notifying the user in response to the detecting.

8. The computer program product of claim 6 wherein the computing device is adapted to use authorization information included in the client request in order to determine whether to send the master profile information.

* * * * *